US012353230B2

(12) United States Patent
Ramasundar et al.

(10) Patent No.: US 12,353,230 B2
(45) Date of Patent: Jul. 8, 2025

(54) DVR WITH PULSED CONTROL AND GRADUAL NLC

(71) Applicant: Intel Corporation, Santa Clara, CA (US)

(72) Inventors: Anand Ramasundar, Portland, OR (US); Cary Renzema, North Plains, OR (US); Fabrice Paillet, Portland, OR (US); James Keith Hodgson, Hillsboro, OR (US); Po-Cheng Chen, Tigard, OR (US); Sergio Carlo Rodriguez, Hillsboro, OR (US); Harish K. Krishnamurthy, Beaverton, OR (US); Jason Muhlestein, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 685 days.

(21) Appl. No.: 17/561,109

(22) Filed: Dec. 23, 2021

(65) Prior Publication Data

US 2023/0205244 A1 Jun. 29, 2023

(51) Int. Cl.
*G05F 1/56* (2006.01)
*G05F 1/565* (2006.01)
*G05F 1/575* (2006.01)

(52) U.S. Cl.
CPC .............. *G05F 1/575* (2013.01); *G05F 1/565* (2013.01)

(58) Field of Classification Search
CPC .......... G05F 1/575; G05F 1/565; G05F 1/571; G05F 1/59; G05F 1/595
See application file for complete search history.

(56) References Cited

U.S. PATENT DOCUMENTS

| | | | | |
|---|---|---|---|---|
| 2011/0012570 A1* | 1/2011 | Liu | ........................ | H05B 45/38 323/225 |
| 2018/0284823 A1* | 10/2018 | Na | .......................... | G05F 1/575 |
| 2021/0408906 A1* | 12/2021 | Rosolowski | ............ | H02M 1/36 |

FOREIGN PATENT DOCUMENTS

| | | |
|---|---|---|
| CN | 112130613 A | 12/2020 |
| GB | 2539458 A | 12/2016 |

OTHER PUBLICATIONS

European Search Report and Search Opinion, EP App. No. 22208180.4, Sep. 20, 2023, 17 pages.

(Continued)

*Primary Examiner* — Adolf D Berhane
*Assistant Examiner* — Afework S Demisse
(74) *Attorney, Agent, or Firm* — NICHOLSON DE VOS WEBSTER & ELLIOTT LLP

(57) ABSTRACT

An apparatus, system, and method for digital voltage regulator (DVR) control are provided. A DVR includes comparators configured to determine whether VLOAD drops below a gradual non-linear control (NLC) undershoot threshold voltage, rises above or drops below a reference voltage, and rises above a gradual NLC overshoot threshold voltage, respectively, power gates (PGs) configured to adjust VOUT based on a provided PG code; and VR controller circuitry comprising synchronous LC circuitry configured to increase or decrease, by a first increment, the PG code responsive to the VLOAD dropping below the reference voltage and rising above the reference voltage, and asynchronous gradual NLC circuitry configured to increase or decrease, by a second increment greater than the first increment and less than half a maximum PG code value, the PG code responsive to the VLOAD dropping below the gradual NLC undershoot threshold voltage and rising above the gradual NLC overshoot threshold voltage.

20 Claims, 10 Drawing Sheets

(56) References Cited

OTHER PUBLICATIONS

Jung et al., "A Fast Transient Response Hybrid LDO with Highly Accurate DC Voltage using Countable Bidirectional Binary Search and Soft Swap Switching", IEEE Transactions on Circuits and Systems II: Express Briefs, vol. 67, No. 12, Dec. 2020, pp. 3272-3276.

Partial European Search Report and Search Opinion, EP App. No. 22208180.4, May 15, 2023, 15 pages.

Wang et al., "A Sub-10fs FOM, 5000x Load Driving Capacity and 5mV Output Ripple Digital LDO with Dual-Mode Nonlinear Voltage Detector and Dead-Zone Charge Pump Loop", IEEE Radio Frequency Integrated Circuits Symposium (RFIC), Aug. 4, 2020, pp. 315-318.

* cited by examiner

DVR WITH PULSED CONTROL AND GRADUAL NLC

TECHNICAL FIELD

Embodiments pertain to voltage regulators (VRs). Some embodiments relate to digital linear (DL) VRs (DLVRs) with linear control, non-linear control, and an intermediate control called power gate boosting.

BACKGROUND

Advanced microprocessors demand high performance and efficient power delivery circuits. Motherboard (MB) VR or Fully Integrated (FI) VR are existing solutions with an external or in-package inductor. While such switching converter solutions, like FIVR and MBVR, offer higher efficiency operation in certain operating conditions, designing good inductors on-chip or close to silicon remains a challenge. Additionally, due to the physical limitation of the inductor, in which it takes a prohibitive amount of time to change current, inductor-based solutions suffer from relatively poor transient response time.

BRIEF DESCRIPTION OF THE FIGURES

In the FIGS., which are not necessarily drawn to scale, like numerals may describe similar components in different views. Like numerals having different letter suffixes may represent different instances of similar components. The FIGS. illustrate generally, by way of example, but not by way of limitation, various embodiments discussed in the present document.

DETAILED DESCRIPTION

Figure 1:
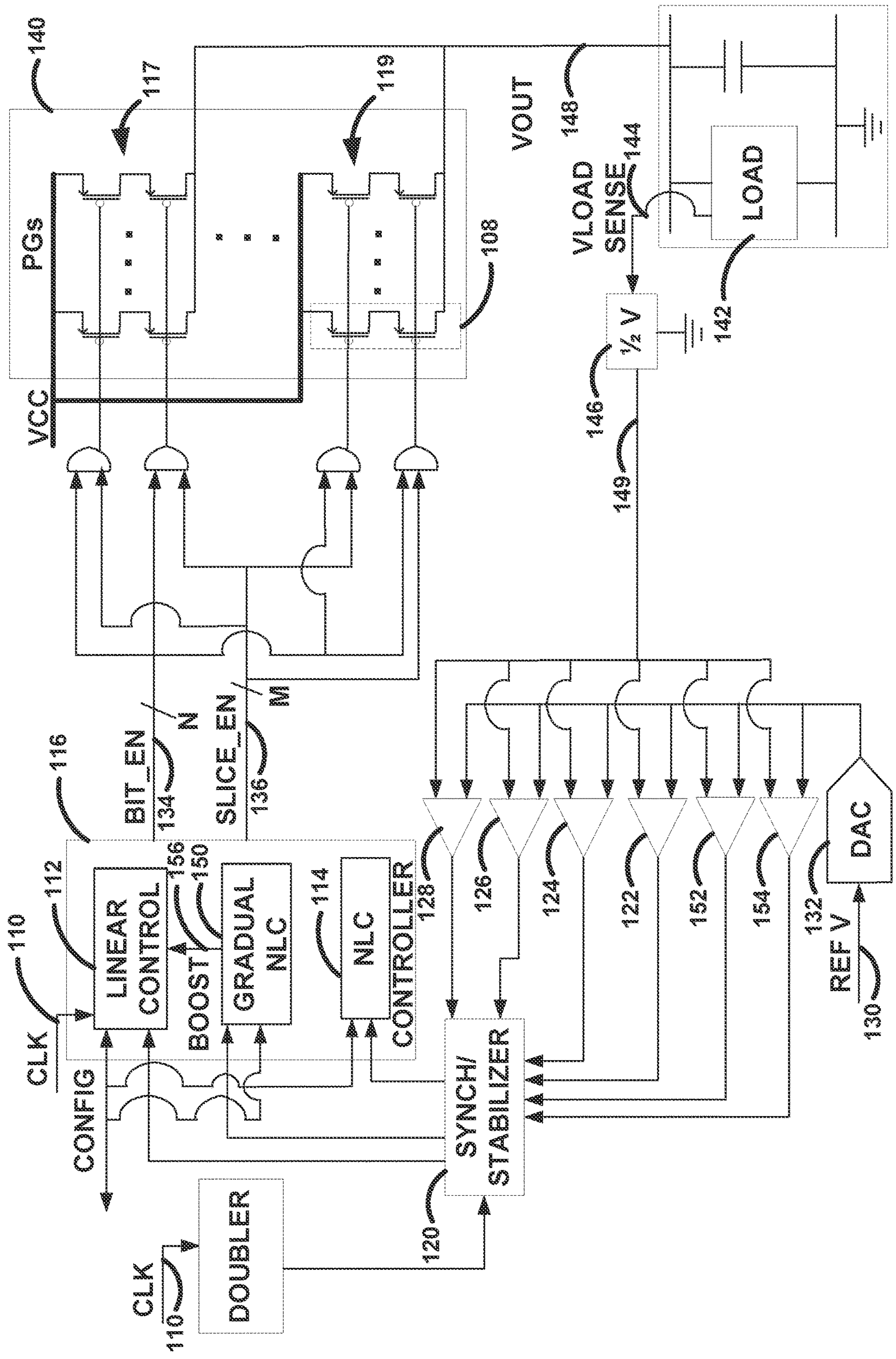
FIG. 1 illustrates, by way of example, a circuit diagram of a VR system with a hybrid linear control (LC), gradual non-linear control (NLC), and NLC controller.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Gradual Non-Linear Control (NLC) and Power Gate (PG) Code Boosting for Digitally Controlled VRs In a digital voltage regulator (DVR), LC can be provided by a controller that operates using linear proportional-integral-derivative (PID) control. Such a controller can only regulate a closed loop with limited bandwidth due to clock delay of synchronous control logic. A parallel asynchronous non-linear control (NLC) with a binary search algorithm (BSA) is one of the fastest ways to find the optimal power gate code solution, but it stresses the input power delivery network on every NLC event because all the power gates rapidly turn on and pull a maximum specification current, ICCMAX, from an input power supply.

A previous DLVR solution relies on an NLC that turns on the entire power gate array rather than only a set fraction of the array. Turning on the entire power gate array helps recover the output voltage in case of an ICCMAX load step. This is beneficial because the NLC is the last tool that the regulator has to recover the output voltage.

Turning on all of the power gates when the load current does not reach the specified maximum current means that the regulator is temporarily drawing more current than necessary from the input supply. The down sides of this are:

(i) Possible over voltage at the output due to extremely sharp slew rate;

(ii) Excess noise on the input rail disturbing the regulation of other supplies with inputs on the same rail;

(iii) Possible over current on the input supply rail if drawing more than the rated ICCMAX for a duration of time.

Embodiments include a "gradual" NLC feature in which a predetermined percentage, PG_INC_DEC, of a maximum code, PGMAX, is added or subtracted to a PID code used in LC. The PG_INC_DEC gets injected every time a gradual-NLC comparator trips. The gradual NLC feature softens the transition between the linear loop, which is clean but slow, and the NLC loop which provides the maximum current as fast possible.

The gradual NLC prevents the full NLC from firing as often which saves power, and it also reduces noise on the input supply rail. In cases where the gradual NLC cannot supply enough current to prevent the full NLC from being triggered, the gradual NLC acts as a sort of intermediate step in which a specified number of the PGs turn on before the full PG array is enabled, reducing the sharpness of a di/dt spike as compared to turning on the full PG array without the gradual NLC.

In the presence of large load steps, the gradual NLC will reduce the number of times that a full NLC will be triggered. In DLVR, the BSA associated with the full NLC injects large spikes into the input supply rail. In contrast the gradual NLC can cause dithering or "bouncing" around the gradual NLC setpoint voltage without spikes as large as the BSA NLC.

If a periodic load step is applied such that the gradual NLC fires, and the full NLC does not fire, then a set portion of the PG array should be visible in infrared emission microscopy (IREM) that is enabled with less average on time than the linearly enabled portion of the power gate. This will show up as cold (off), warm (gradual NLC power gates), and hot (linear power gates).

As previously discussed, in many DVRs, a linear PID controller can regulate the closed loop with only a limited bandwidth due to clock delay of the synchronous control logic. A parallel, asynchronous NLC with a BSA is one of the fastest known ways to find the optimal PG code solution. However, the BSA stresses the input power delivery network on every NLC event because all the PGs of a PG array turn on concurrently and pull ICCMAX from the input supply.

Embodiments provide a new asynchronous "gradual" NLC feature is claimed where a predetermined amount (e.g., in terms of a percentage of the maximum PGMAX, or a constant integer greater than one (1) or greater than the amount used in the PID LC) is added or subtracted to the PID code, and a corresponding current is injected every time the gradual-NLC comparator trips.

This disclosure proceeds by describing a DLVR with LC, NLC, and gradual NLC control where NLC control is optional, then details of gradual NLC control are provided.

FIG. 1 illustrates, by way of example, a circuit diagram of a VR system with a hybrid controller 116 including LC, gradual NLC, and NLC control. To supply current to a load 142 while regulating VLOAD 144 at a given reference value, the VR controller 116 can operate metal oxide semiconductor (MOS) (or other semiconductor type) power gate (PG) slices 117, 119. Each of the slices are coded with binary weighted power gates where b[0] indicates a least significant bit (LSB) PG device and b[P] indicates the most significant bit (MSB) PG device. Note that the MSB device is effectively about 2^(P−1) (e.g., if P=15 then the MSB device is 16384) times larger than the LSB device. Each of the PG devices is illustrated as including a stacked configuration (series of two devices). The "lower" device of the stack can be driven by a mid-rail voltage while the upper device can be controlled by the level control logic generated by the digitally implemented 'decision logic' block. Stabilized output of six comparators 122, 124, 126, 128, 152, 154 (e.g., NLC overshoot, gradual NLC overshoot, linear overshoot, linear undershoot, gradual NLC undershoot, and NLC undershoot, respectively) can be inputs for the VR controller 116.

The VR controller 116 decides which control technique, a synchronous LC technique implemented by the LC circuitry 112, a gradual NLC technique implemented by the gradual NLC circuitry 150, or the asynchronous NLC technique implemented by the NLC circuitry 114 to implement based on the comparator 122, 124, 126, 128, 152, 154 output. Each of the comparators 122, 124, 126, 128, 152, 154 receives 50% (or other percentage, of the output voltage (VLOAD 694) signal from a voltage divider 146 at one input and the other input can be fed from multiple digital to analog converters (DACs) or a single DAC 132 with multiple outputs. A stable reference voltage (REF V 130) can provide the DAC 132 with a reference voltage to produce the NLC overshoot threshold voltage fed to comparator 128, the gradual NLC overshoot threshold voltage fed to comparator 126, the linear overshoot threshold voltage fed to comparator 124, the linear undershoot threshold voltage fed to comparator 122, the gradual linear undershoot threshold voltage fed to comparator 152, and the NLC undershoot threshold voltage fed to comparator 154. These threshold voltage levels set the threshold at which the NLC circuitry 114, the gradual NLC circuitry 150, and the LC circuitry 112 are triggered by the VR controller 116.

The VR controller 116 controls VOUT 148 and ultimately VLOAD 144 by changing a binary code provided to the PGs 140. The binary code is set using BIT_EN and SLICE_EN variables that control voltage on control traces 134, 136, respectively. The VR controller 116 can maintain a voltage within a narrow band of +/−5 mV around a target voltage ID (VID), the nominal voltage.

VLOAD 144 can be sensed, then divided by 2 (or another integer or real number) by the voltage divider 146, before being sent to analog circuitry (e.g., the comparators 122, 124, 126, 128, 152, 154). Hence, the analog circuitry can operate in a "half-voltage" or other partial voltage domain. The divider 146 is assumed to operate using division by 2, although a different integer or number is possible and contemplated.

The analog circuitry can include a 2-stage DAC 132 (to save area). The first level of the DAC 132 can include a 50-step (or other number of steps) resistive ladder, fed by a trimmed, external system on chip (SoC) band-gap reference of 1V (or other reference voltage level). Assuming 50 steps and a 1V REF V 130, the first level of the DAC can produce 20-mV steps and is used to generate a 160-mV range, which can be buffered (using two unity gain buffers (UGBs)) and can provide high and low voltage reference voltages for a second level resistive DAC ladder, comprising 256 steps (or other number of steps). Assuming a 256 step second level resistive ladder along with a 50 step first level resistive ladder and a 1V REF V 130 results in a final DAC resolution of 0.625 mV. Since the DAC voltage domain represents half the load domain, each DAC step of 0.625 mV corresponds to 1.25 mV at the load. Six voltage levels can be provided from the second level of the DAC 132 (e.g., using six separate pass gate trees), and the six corresponding comparators 122, 124, 126, 128, 152, 154 can be used to compare the voltage to VLOAD/2 149. If VLOAD 144 is within +/−5 mV of the target VID (2.5 mV in the "half domain"), then it can be deemed to be nominal by the VR controller 116. But if VLOAD 144 is either within the top (or bottom) linear regulation zones (either (i) the comparator 124 indicates a voltage is greater than the LC overshoot threshold while the comparator 126 concurrently indicates that the VLOAD/2 149 is less than the gradual NLC overshoot threshold or (ii) the comparator 122 indicates a voltage is less than the linear undershoot threshold while the comparator 152 concurrently indicates that the VLOAD/2 149 is greater than the gradual NLC undershoot threshold 230), then the digital controller 116 applies uses the LC circuitry 112 to increase (or decrease) the PG binary code to bring the VLOAD/2 149 back to nominal.

If the LC technique fails to bring the voltage back to nominal and VLOAD/2 149 becomes either larger than the gradual NLC overshoot threshold or smaller than the gradual NLC undershoot threshold, then the VR controller 116 can activate the gradual NLC circuitry 150 that implements the gradual NLC technique to change the PG code to adjust VLOAD/2 149 back within the LC overshoot threshold and the LC undershoot threshold 108.

If the gradual NLC technique fails to bring the voltage back within a range that is manageable by the gradual NLC circuitry 150 and VLOAD/2 149 becomes either larger than the NLC overshoot threshold 220 or smaller than the NLC undershoot threshold 232, the VR controller 116 can activate the NLC circuitry 114 that implements the NLC to change the PG code to adjust VLOAD/2 149 back within the gradual NLC overshoot threshold voltage 222 and gradual NLC undershoot threshold voltage 230 or even the LC overshoot threshold voltage 224 and LC undershoot threshold voltage 228. A power delivery network (PDN) can be designed such that it meets the maximum specified current requirements of a heaviest load 142, which, in turn, guarantees that the NLC circuitry 114 is effective.

Studies of VR controller 116 control loops show it to be unconditionally stable, albeit with a ripple whose amplitude is directly proportional to a round-trip control loop delay. A VR controller design can aim for a specified loop delay (e.g., about 0.7 ns or a greater or lesser delay), which can result in a bounded voltage ripple in VLOAD 144 (e.g., +/−20 mV). Further, to help maintain accuracy, the UGBs after DAC level-1 employ hardware offset cancellation, driven by a finite state machine (FSM), upon power-up. The cancellation is achieved by adding (or removing) transistors from the DAC UGB's differential stages, thus improving temperature stability of the cancelled offset. The comparators 122, 124, 126, 128, 152, 154 can be similarly hardware (HW) offset-trimmed by circuitry (e.g., an FSM), to within a specified voltage range (e.g., +/−0.625 mV).

The outputs of the comparators 154, 128, 152, 126 can be protected against meta-stability in case VLOAD/2 149 hovers around a comparison threshold (e.g., the NLC overshoot threshold, the gradual NLC overshoot threshold, the gradual NLC undershoot threshold 230, or the NLC undershoot threshold 232). This helps guarantee PG code determinism. The meta-stability protection can be provided by a circuitry-based synchronizers/stabilizers 120. The synchronizers/stabilizers 120 can include a meta stability filter that prevents undefined values from propagating to the VR controller 116. This can be accomplished using transistors that receive output signals from the (i) comparators 124 and 126 or 128 or (ii) the comparators 122 and 152 or 154 and prevent the output of the comparators 126, 128, 152, 154 from propagating to the VR controller 116 until the output of the comparators differs by a transistor threshold voltage.

A circuitry-based synchronizers/stabilizers 120 can keep the output of all the comparators 122, 124, 126, 128, 152, 154 in sync with a clock 110. This keeps the LC synchronous. Note that no such synchronous clocking is used in the NLC circuitry 114 or the gradual NLC circuitry 150 making the NLC and gradual NLC asynchronous.

Figure 2:
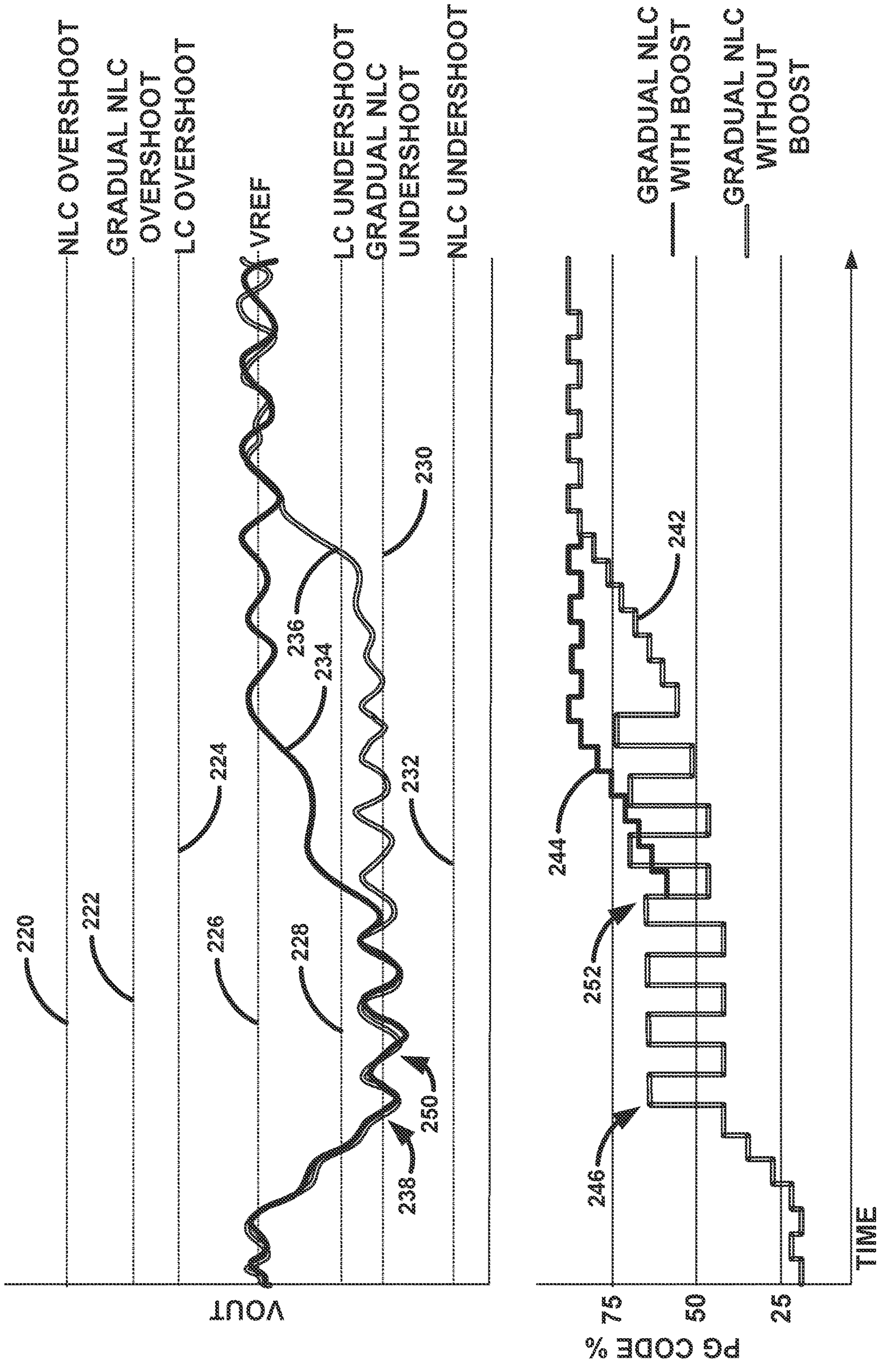
FIG. 2 illustrates, by way of example, a diagram of an embodiment of graphs of voltage and power gate (PG) code versus time for a regulator.

FIG. 2 illustrates, by way of example, a diagram of an embodiment of graphs of voltage and PG code versus time for a regulator, such as the regulator of FIG. 1, that includes LC, gradual NLC, and NLC. The graph includes two plots. A first plot includes output voltage versus time and a second plot includes PG code versus time. A line 234 on the first plot indicates output voltage over time using a gradual NLC with boost. Another line 236 on the first plot indicates output voltage over time using a gradual NLC without boost. As can be seen, the gradual NLC with boost recovers to a nominal output voltage faster than the gradual NLC without boost. To understand why, gradual NLC is now explained.

Gradual NLC is a sort of middle ground between LC and NLC. When one of the gradual NLC comparators 152, 126 asynchronously identifies an NLC event (gradual NLC undershoot or gradual NLC overshoot), the gradual NLC circuitry 150 can be triggered to increment or decrement the PG code provided to the PGs 140. For a gradual NLC overshoot, the PG code can be decremented by a specified gradual NLC amount. For a gradual NLC undershoot, the PG code can be incremented by the specified gradual NLC amount. The gradual NLC amount is greater than an increment/decrement provided by the LC. The gradual NLC amount can be set to a specified percentage of a maximum PG code (e.g., 5%, 10%, 20%, 25%, 30%, 40%, 50%, a greater or lesser percentage that is less than 100% or a percentage therebetween).

A gradual NLC overshoot is detected when the output voltage rises above a gradual NLC overshoot threshold 222. A gradual NLC undershoot is detected when the output voltage droops below a gradual NLC undershoot threshold 230. The gradual NLC circuitry 150 adjusts the current PG code value by the gradual NLC amount, thus turning on or off multiple PGs concurrently.

Referencing the lines 236, 244 which indicate response of the gradual NLC without boosting of the PG code, a first gradual NLC undershoot event is detected at about arrow 238. The gradual NLC circuitry 150 asynchronously increases the PG code indicated arrow 246. This increase temporarily bumps the output voltage back above the gradual NLC overshoot threshold 230. However, the LC does not have enough time to increment the stored PG code enough times to increase the output voltage back to nominal. The LC is operating using a PG code that was not altered by the gradual NLC. Thus, another gradual NLC undershoot event occurs at about arrow 250. The LC continues to increase the PG code, but it take multiple LC cycles to get the output voltage back to nominal without communication between the LC and the gradual NLC.

Boosting is a way of communicating, from the gradual NLC circuitry 150, that a gradual NLC event was detected and that the gradual NLC circuitry 150 adjusted the PG code (albeit temporarily). The gradual NLC circuitry 150 can provide a boost 156 signal to the LC circuitry 112 indicating to boost the PG code. The LC circuitry 112 can adjust its PG code by a specified LC boost amount. The specified LC boost amount is greater than a normal LC increment (typically one (1)) and can be as high as the gradual NLC boost amount. The boost signal 156 can be delayed by synchronization and propagation of the boost 156 signal such that multiple, asynchronous gradual NLC events can trigger a single synchronous boost event.

Gradual NLC with boost is a gradual NLC that communicates to the LC circuitry 112 to boost the PG code. That way, when synchronization catches up, the LC can adjust the PG code to help compensate the PG code and increase the chances that the output voltage can be controlled by the LC or is nominal.

Gradual NLC with boost is depicted by lines 234 and 244. At about the time the gradual NLC event is detected (at about arrow 238), the gradual NLC circuitry 150 can provide the boost signal 156 to the LC circuitry 112. The LC circuitry 112 can wait for synchronization to occur (typically a few cycles of the clock 110) and then adjust the PG code by the LC boost amount. This occurs at about arrow 252 in FIG. 2. In the example of FIG. 2, the LC boost amount, added to the PG code pushes the output voltage over the LC undershoot threshold 228 and back in the nominal range. In some instances, however, this boost in the PG code is insufficient to get the output voltage into the nominal range (between the LC overshoot threshold 224 and the LC undershoot threshold 228). In such instances, if another gradual NLC event is detected, the gradual NLC circuitry 150 can boost the PG code and provide the boost signal 156 to the LC circuitry 112. The LC circuitry 112 can wait for synchronization to occur and boost the PG code again. This can continue until the nominal voltage is obtained.

As can be seen in FIG. 2, the gradual NLC with boost outperforms gradual NLC without boost in terms of time outside of nominal output voltage. The gradual NLC with boost spends less time outside of nominal output voltage range and more time inside of nominal output voltage range than its gradual NLC without boost counterpart.

The gradual NLC circuitry 150 can be used, in some embodiments, without NLC circuitry 114. In such cases, the DLVR relies on the gradual NLC circuitry 150 to help ensure that the output voltage stays in nominal range as much as possible. In such cases, only a subset of the comparators 128, 126, 124, 122, 152, 154 is needed as there are no NLC thresholds to monitor. Without the NLC circuitry 114, the LC circuitry 112 and the gradual NLC circuitry 150 can be in charge of controlling the output voltage. In some embodiments, only a single comparator is used for the LC circuitry 112 operation. That comparator can determine whether the output voltage is above or below a reference voltage and the LC circuitry 112 can adjust the PG code accordingly. In an embodiment that uses a single LC comparator 122 with gradual NLC circuitry 150 control, only three comparators are needed for DLVR operation.

The NLC circuitry 114 can control the PG code when the output voltage is determined to be either above an NLC overshoot threshold 220 or below an NLC undershoot threshold 232. The NLC circuitry 114 can implement a binary search algorithm (BSA) to try to get the output voltage to nominal or otherwise above the NLC undershoot threshold 232 and below the NLC overshoot threshold 220.

Figure 3:
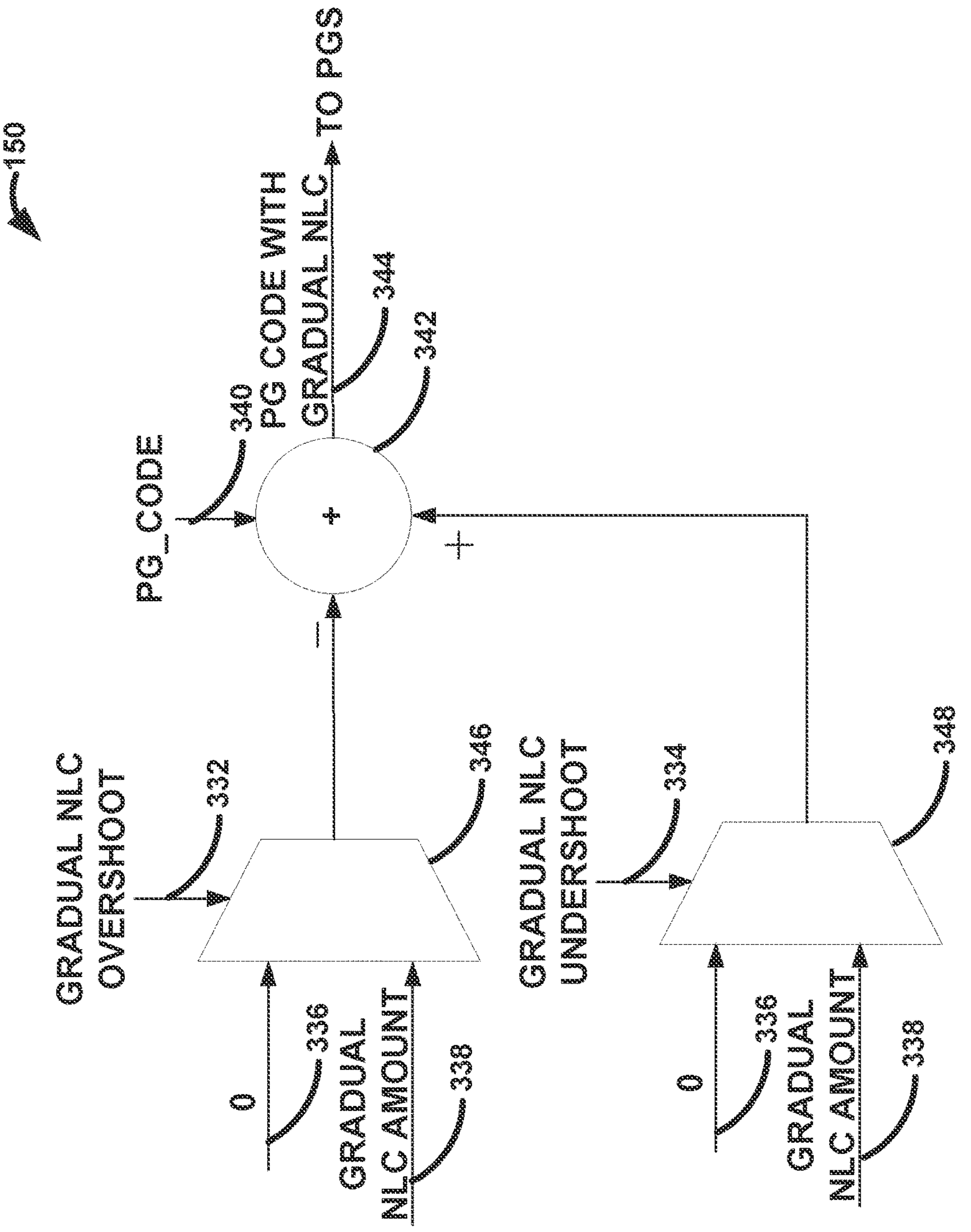
FIG. 3 illustrates, by way of example, a conceptual circuit diagram of an embodiment of the gradual NLC circuitry.

FIG. 3 illustrates, by way of example, a conceptual circuit diagram of an embodiment of the gradual NLC circuitry 150. The gradual NLC circuitry 150 as illustrated includes multiplexers 346, 348, each providing an input to an adder 342.

A first multiplexer 346 provides a the gradual NLC amount (e.g., negative gradual NLC amount) in response to the gradual NLC overshoot comparator 126 indicating that the output voltage 149 is greater than the gradual NLC overshoot threshold 222. The gradual NLC overshoot comparator 126 can assert (or equivalently de-assert) a gradual NLC overshoot signal 332 responsive to the output voltage 149 being greater than the gradual NLC overshoot threshold 222. The multiplexer 346 can provide a negative of the gradual NLC amount 338 to the adder 342 if the gradual NLC overshoot signal 332 is asserted. The multiplexer 346 can provide a digital zero 336 to the adder 342 if the gradual NLC overshoot signal 332 is de-asserted.

A second multiplexer 348 provides a the gradual NLC amount in response to the gradual NLC undershoot comparator 152 indicating that the output voltage 149 is less than the gradual NLC undershoot threshold 230. The gradual NLC undershoot comparator 152 can assert (or equivalently de-assert) a gradual NLC undershoot signal 334 responsive to the output voltage 149 being less than the gradual NLC undershoot threshold 230. The multiplexer 348 can provide the gradual NLC amount 338 to the adder 342 if the gradual NLC undershoot signal 334 is asserted. The multiplexer 348 can provide a digital zero 336 to the adder 342 if the gradual NLC undershoot signal 334 is de-asserted.

The adder 342 can sum the inputs from the multiplexers 346, 348 and a PG code 340 (stored in a memory local to the controller 116). A PG code with gradual NLC adjustment 344 is the result of the summation performed by the adder 342. The PG code with gradual NLC adjustment 344 can be converted to BIT_EN 134 and SLICE_EN 136 and provided to the PGs 140.

The gradual NLC circuitry 150 can be triggered to operate responsive to either the gradual NLC overshoot comparator 126 or the gradual NLC undershoot comparator 152 detecting a gradual NLC event. This allows the gradual NLC circuitry 150 to be inoperable until a gradual NLC event has been detected and prevents the gradual NLC circuitry 150 from adjusting the PG code 340 provided to the PGs 140 outside of a gradual NLC event.

As the output voltage 149 gets back into the LC range, a multiplexer (mux) of the controller 116 can switch control back to the LC circuitry 112 (e.g., a loop PID controller). There is no hysteresis in the LC mode other than the hysteresis from the delays through the loop (see FIG. 2, lines 236 and 242).

By introducing a gradual NLC PG Boost code the voltage can recover quickly, however, it is possible that the PID (LC) does not register a droop since the PID is not registering a voltage threshold bin change. A condition where the PID and gradual NLC oscillate is therefore possible (see line 236). To solve this condition, a PG code boost has been added by the LC to help the PID converge back to nominal. After the first gradual NLC event is detected, the information is passed to the PID, where a delta code is injected into it, which will look like a more significant proportional term for that one cycle. The gradual NLC detection logic is reset after this injection, at which point it waits for a specified period of time and then looks for future gradual NLC events, and the whole boost process repeats itself.

The gradual NLC prevents the full NLC from firing as often which saves power, and it also quiets the input supply rail. In cases where it cannot supply enough current to prevent the full NLC from being triggered, it acts as a sort of intermediate step where a sizeable amount of power gate turns on before the full array is enabled, saving the input network from as sharp of a di/dt as it would have otherwise seen.

Note that the multiplexers 346, 348 are before the adder in the embodiment of FIG. 3. Embodiments that implement equivalent logic are understood by the inventors and within the scope of these teachings. Some embodiments can include multiplexers 346, 348 after the adder and such embodiments can avoid calculation delay in the gradual NLC value.

Entry and Exit for Pulsed Current Mode in Digital Voltage Regulators

Digital PG-based VRs suffer from reduced stability due to increased output impedance at light loads. The increased output impedance at light loads moves non-dominant poles to lower frequencies while the loop gain increases. The moving of the non-dominant poles to lower frequencies and loop gain increases both tend to push a control loop toward instability.

A problem of gain at light loads is uniquely challenging in digital PG-based designs as opposed to traditional analog LVRs because the equivalent transconductance (gm) of the digital power stage is constant across load currents whereas in analog loops the (gm) reduces with load current. With reduced load current comes increased output resistance (Rout), with the product of gm and Rout being the voltage gain of the output stage of the regulator.

Previous solutions explicitly reduced the gain of a controller by inferring light load conditions from known operating point parameters, such as low output voltage setpoint or input voltage setpoint minus output voltage setpoint, also known as dropout voltage. The low output voltage setpoint entered a form of pulse frequency modulation (PFM) with hysteretic control with entry and exit based on output voltage. The low output voltage setpoint is not a true pulse current modulation (PCM) because low output setpoint does not employ current regulated PGs.

In both the low output voltage setpoint and input setpoint minus output voltage setpoint solutions, the gain is adjusted solely based on voltage setpoints rather than the load current, which is the actual primary cause of the output impedance variation. A fast, accurate current sensor could potentially be used to determine a proper gain setting; however, a robust current sensor is difficult to design under normal die area and die power constraints.

Embodiments provide a digital PG with current regulation. In embodiments, the current in each PG is determined by a closed loop which keeps the current in active branches of the PG nearly constant for nearly all dropout voltages. Knowing the current in each PG branch means it is easy to infer the approximate load current simply by multiplying branch current times number of branches enabled (represented by the PG code). Embodiments enter pulsed current mode (PCM=injecting a pulse of known current using a form of hysteric control) based on a PG code threshold and exits to LC when the output voltage drops below a given threshold.

The PCM enables a stable control loop at very light current loads. The method of entry into the PCM mode and exit out of the PCM mode is based on load conditions driven by real time data rather than inferred based on voltage operating point. This allows for improved control at all voltage and current setpoints and does not limit the regulator from delivering high current at low output voltages or from being stable at light loads at high output voltages as is the case with prior solutions.

A regulator using PCM can be detected at very light loads by observing the steady state output ripple pattern. As load current increases, pulses will become more frequent or longer in duration until the pulses are fully saturated to the point the voltage will begin to drop. As the voltage drops beyond a certain point there will be a change from fixed current pulses to a smoother continuous regulation. The way to re-enter PCM is to ramp the load current back down until the minimum PG code threshold is reached and fixed pulses once again start firing.

Figure 4:
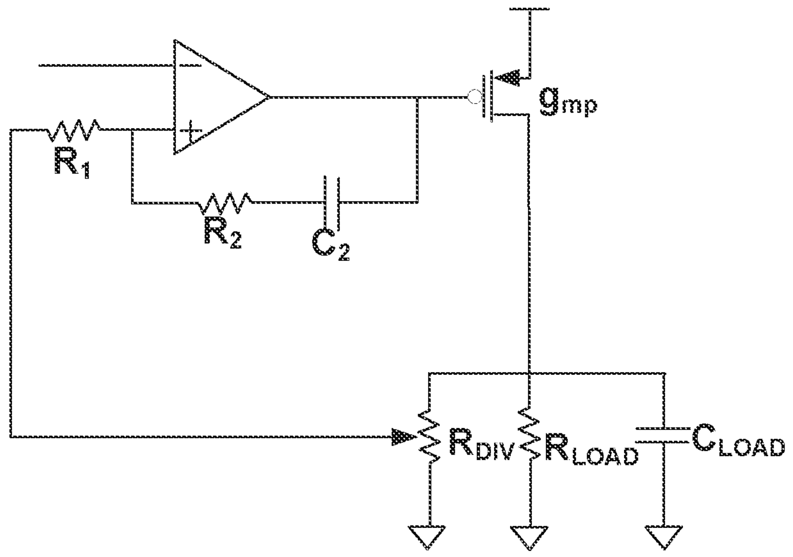
FIG. 4 illustrates, by way of example, a diagram of an embodiment of an analog linear voltage regulator (LVR).
Figure 5:
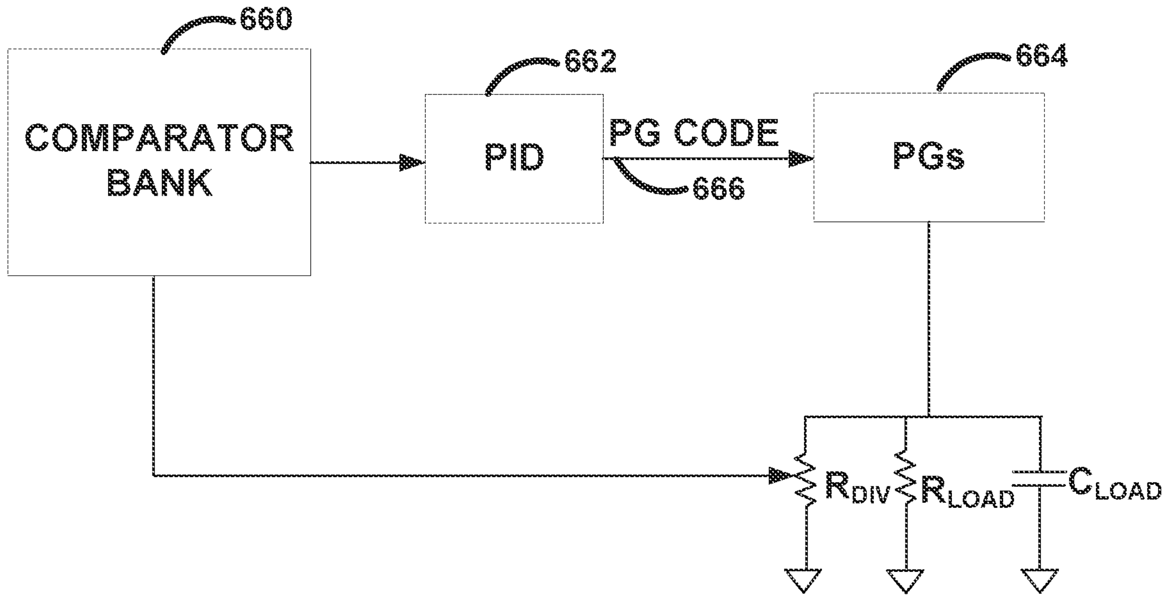
FIG. 5 illustrates, by way of example, a diagram of an embodiment of a DVR.

FIG. 4 illustrates, by way of example, a diagram of an embodiment of an analog LVR. FIG. 5 illustrates, by way of example, a diagram of an embodiment of a DVR. FIGS. 4 and 5 illustrate why there is a difference between the analog and digital loop gms. In the analog LVR of FIG. 4, gmp is a direct function of output current. Equation 1 shows how gmp is determined for the analog LVR of FIG. 5.

$$g_{mp} = \frac{\partial i_{out}}{\partial V_G} = \frac{2I_{out}}{V_{GS} - V_T} \qquad \text{Equation 1}$$

The DVR includes a comparator bank 660 that provides an indication of the output voltage to the controller (in the example illustrated there is only an LC in the form of a PID controller 662). The PID controller 662 generates a PG code 340 that controls which PGs of the PGs 664 conduct and which PGs of the PGs 664 do not conduct.

In the DVR of FIG. 5, gmpg is constant across load currents because the PG branch current is not a function of the load current. This is because, at higher loads the controller simply turns on more PGs with no change to the operating conditions of the PGs that are already active. Equation 2 shows how gmpg is determined for the DVR of FIG. 5.

$$g_{mp} = \frac{\partial i_{out}}{\partial PG_{CODE}} \qquad \text{Equation 2}$$

For an example in which there are 8 slices of 10 PGs with branch current regulated to 20 micro-Amps and a 50 Amp DLVR, there is about 1.6 milli-Amps per PG code increment.

Figure 6:
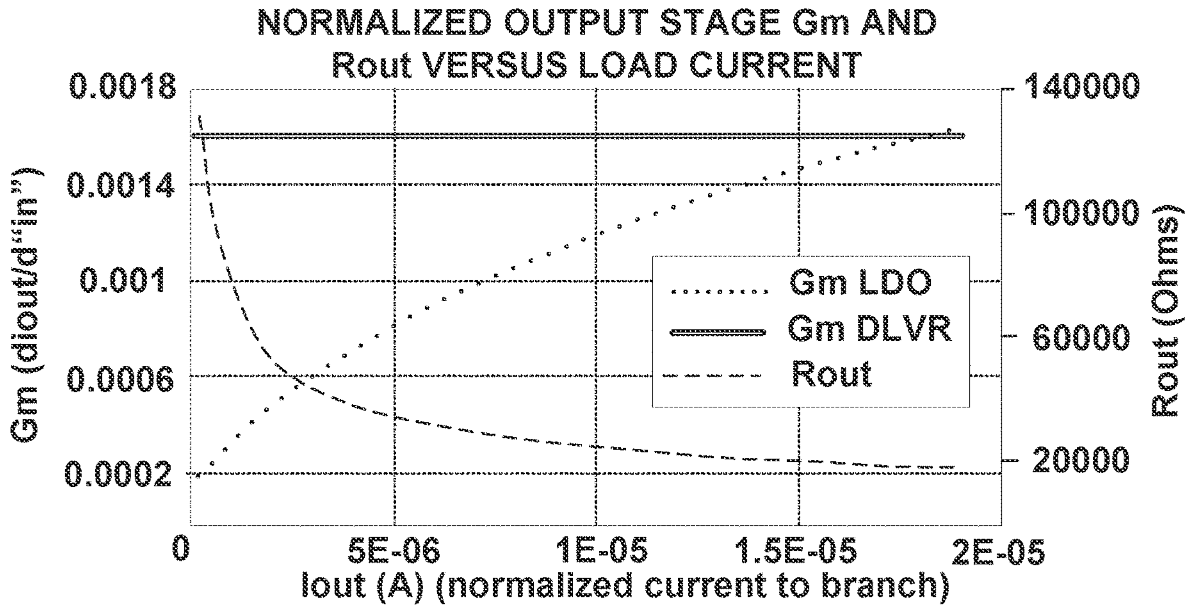
FIG. 6 illustrates, by way of example, a graph of gm of an analog regulator (LDO) and a digital regulator (DLVR) as well as output resistance across load currents for the DLVR.

FIG. 6 illustrates, by way of example, a graph of gm of an analog regulator (LDO) and a digital regulator (DLVR) as well as output resistance across load currents for the DLVR. The load current increases as the output resistance drops and the Gm remains generally constant. For the LDO Gm increases as the load current increases.

Figure 7:
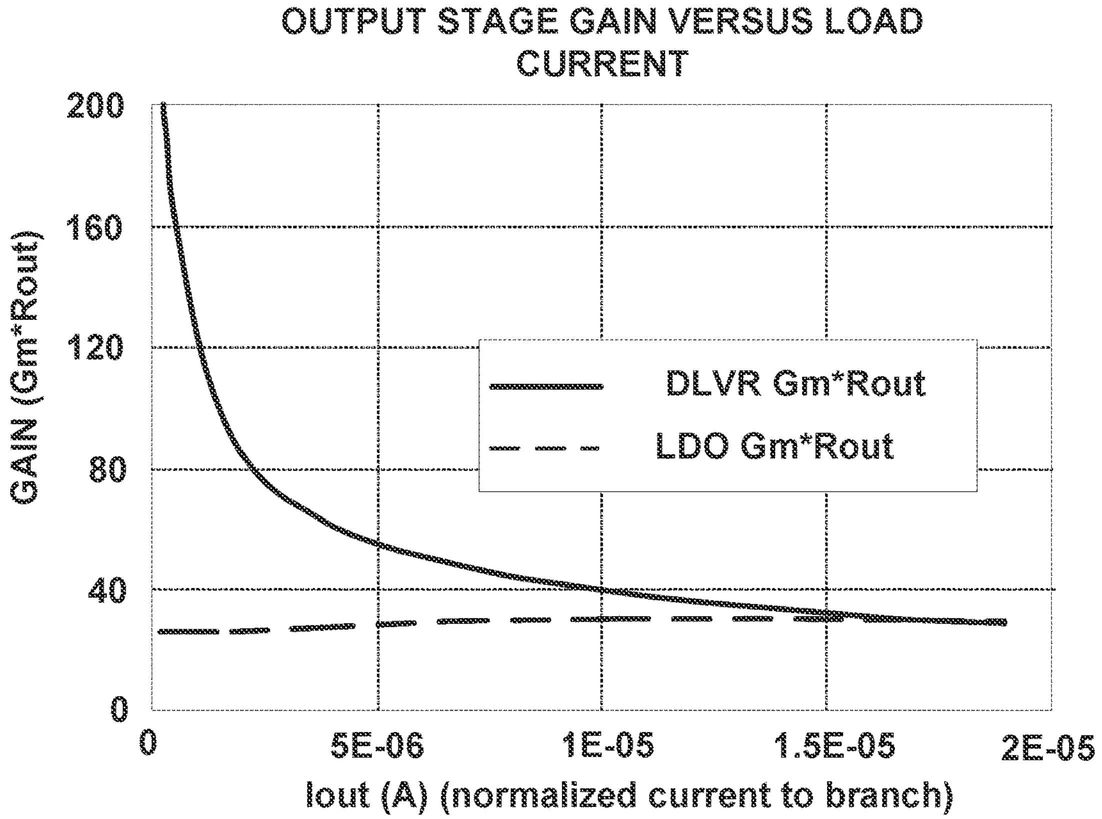
FIG. 7 illustrates, by way of example, a graph of output stage gain versus load current for the DLVR and analog regulator (LDO).

FIG. 7 illustrates, by way of example, a graph of output stage gain versus load current for the DLVR and analog regulator (LDO). The gain of the analog regulator remains generally constant, while the gain of the DLVR is very high at low load currents and drops as the load current increases. Without reducing controller gain as a function of the high output stage gain in the digital regulator, the loop will be unstable. This is because, as the load current drops, the output resistance increases but the output current remains generally constant. Adaptive gain techniques can modify the LC loop gain in response to reduced load current, but at some point, the load current may become too small for gain modification to produce usable controller coefficients because of reduced resolution with very small binary numbers (PG code).

Embodiments provide a pulsed current modulation (PCM) operation mode that solves the issue of gain at low load currents. The controller 116 monitors the PG code and, when the PG code drops below the threshold value, the controller 116 turns control over to PCM circuitry 1110. The PCM circuitry 1110 operates the PGs 140 using the PCM PG code 1012. The PCM PG code 1012 is to a specified value when the output voltage of the PGs is less than a reference voltage (as determined by a comparator). The PCM circuitry 1110 turns off the PGs (sets the PCM PG code to zero) when the output voltage is greater than the reference voltage (as determined by the comparator).

Figure 8:
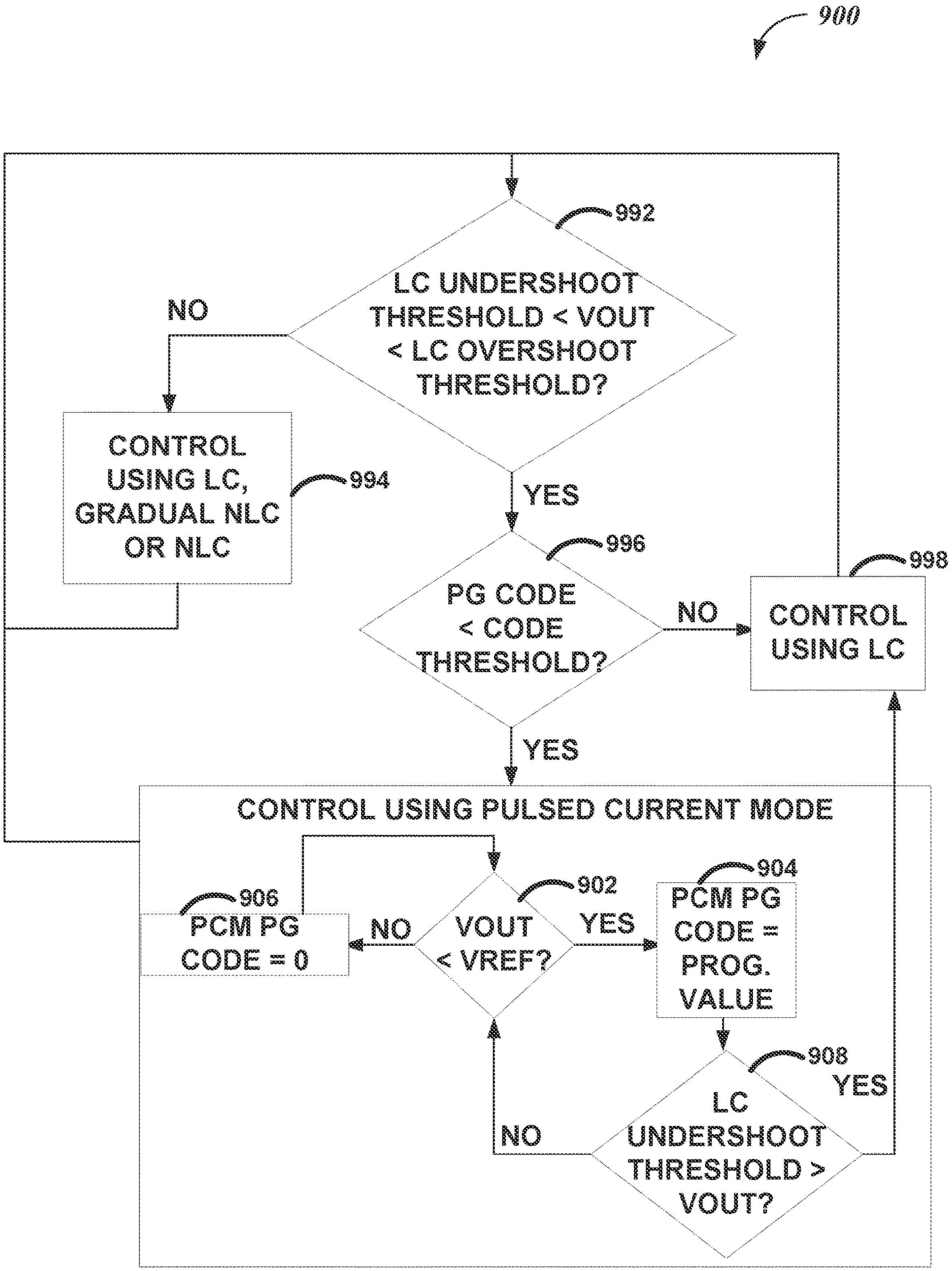
FIG. 8 illustrates, by way of example, a flow diagram of an embodiment of a method for controlling an output current.

FIG. 8 illustrates, by way of example, a flow diagram of an embodiment of a method 900 for controlling an output current. The method 900 can be implement by a DLVR controller. The method 900 avoids the problem of extreme gains for small loads using PCM. The method 900 as illustrated includes determining, at operation 992, whether an output voltage is within nominal LC bounds. The nominal LC bounds are defined by the LC undershoot threshold 228 and the LC overshoot threshold 224. An output voltage within these bounds is considered nominal. That is, an output voltage greater than the LC undershoot threshold 228 and less than the LC overshoot threshold 224 is nominal. If the output voltage (VOUT 148) is not nominal, the controller 116 can implement LC, gradual NLC, or NLC to control the output voltage at operation 994. If the output voltage is determined nominal at operation 992, the controller determines whether the PG code 340 is less than a PG code threshold 1012. The PG code threshold 1012 is set based on the performance of the DLVR at light loads. The PG code threshold can be set, for example, based on a minimum amount of power required for operation of the LC.

If the PG code 340 is determined to be greater than (or equal to) the PG code threshold 1012 at operation 996, then the controller 116 can operate using LC (e.g., the PID 662). If the PG code 340 is determined to be less than (or equal to) the PG code threshold 1012 at operation 996, then the controller 116 can operate using PCM.

PCM includes comparing the output voltage (VOUT 148) to the reference voltage (VREF 226) at operation 902. If the output voltage is determined to be less than the reference voltage at operation 902, the PCM PG code 1112 is set to a specified value 1014 at operation 904. The specified value 1014 is programmable and can be set to, for example, two times the minimum amount of power required for operation of the LC, among others. The PCM PG code 1112 is greater than the PG code threshold 1012. If the output voltage is determined to be greater than the reference voltage at operation 902, the PCM PG code 1112 can be set to zero at operation 906. At operation 908, the PCM circuitry 1110 can determine whether VOUT is less than the LC undershoot threshold 228. If it is determined, at operation 908, that VOUT is less than the LC undershoot threshold 228, the PCM circuitry 1110 can relinquish control of the PGs 140 to the LC circuitry 112. The LC circuitry 112 can set the PG code 340 to the specified value 1014 (see FIG. 9) and perform LC of the output voltage from there. If it is determined, at operation 908, that VOUT is greater than (or equal to) the LC undershoot threshold 228, the PCM circuitry 1110 can continue control of the PGs 140 at operation 902. The PCM control includes returning to operation 902 after operation 906 and if the operation 908 determined the VOUT is greater than the LC undershoot threshold 228. The method 900 returns to operation 992 after the operations 998, 994, and control using PCM (either operation 904 or 906).

Figure 9:
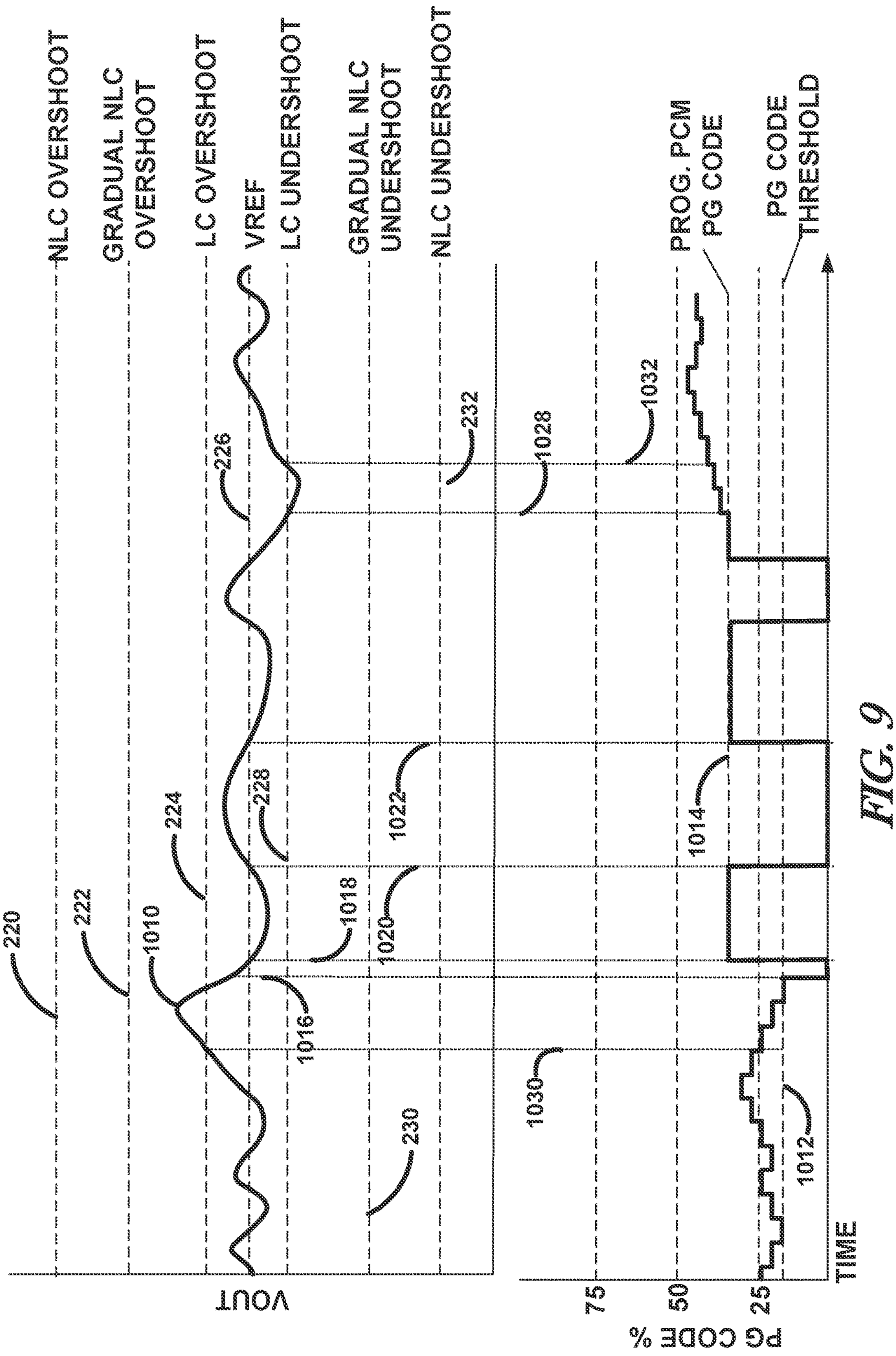
FIG. 9 illustrates, by way of example, a graph of the output voltage wave form entering and exiting PCM and a corresponding PG code.

FIG. 9 illustrates, by way of example, a graph of the output voltage wave form 1010 entering and exiting PCM and a corresponding PG code threshold 1012. In a branch current-regulated DVR, the output current can be inferred directly from how many PGs are enabled (indicated by the PG code 340) and the fixed branch current. The PG code 340 can be multiplied by the fixed branch current to determine the output current. Because the controller 116 knows the number of enabled power gates (via the PG code 340 or PCM PG code 1112) it can switch from LC to PCM by simply comparing the PG code 340 to a pre-determined PG code threshold 1012. If the PG code 340 is lower than the PG code threshold 1012 the controller switches to PCM control (by PCM circuitry 1110, see FIG. 10). An event 1016 indicates a time at about which the PG code 340 is lower than the PG code threshold 1012. Since the output voltage 1010 is greater than VREF 226, the PCM control turns off all PGs, by setting the PCM PG code 1112 to zero.

Then, when the output voltage drops below the VREF 226 again (at event 1018), the PCM control sets the PCM PG code 1112 to the specified PCM PG code 1014. As long as the voltage is below VREF 226 the load current remains small enough for the charge injection of the pulse to raise the voltage back above VREF 226 the controller 116 stays in PCM mode (using PCM circuitry 1110 to control the output voltage). At event 1020, the output voltage raises above VREF 226. As at event 1016, the PCM control turns off all PGs, by setting the PCM PG code 1112 to zero.

At event 1022 the output voltage drops back below VREF 226 and the PCM control sets the PCM PG code 1112 (see FIG. 10) to the specified PCM PG code 1014. When the controller 116 is operating using PCM, each time the output voltage 1010 drops below VREF 226 another PCM PG code 1112 pulse at the PCM PG code 1014 value is injected for the duration of the drop. If the output load current increases to the point where the output voltage 1010 drops below the LC undershoot threshold 228 (e.g., at event 1028), then the controller 116 assumes that the fixed current pulses are no longer strong enough to regulate the output and the controller 116 transitions back to LC. The handoff to the LC can include setting the initial LC output equal to the magnitude of the PCM pulse by setting the PG code 340 equal to the specified PCM PG code 1014.

At event 1030, the output voltage 1010 has risen above the LC overshoot threshold 224. Since all the PGs are already turned off, there is nothing the controller 116 can do to reduce the voltage 1010 so no action is taken until the output voltage drops below VREF 226. At event 1032, the output voltage 1010 has returned to nominal. Since the PG code 340 is greater than the PG code threshold 1012, the LC controls operation and operation is not handed over to the PCM.

In sum, PCM entry is based on the PG code 340, which indicates a minimum current the LC needs to handle. After the PG code 340 drops below the PG code threshold, PCM can be entered. The entry into the PCM is the PG code 340 and the PG code threshold 1012. While in PCM mode a comparator determines whether to exit. If the output voltage is above a specified threshold voltage then the controller 116 stays in PCM. If the output voltage drops below the specified threshold voltage then the controller 116 can exit PCM and return to LC. What happens when they are equal is just a boundary condition, but it is handled the same as an LC comparator so the handoff between linear and PCM mode will be handled cleanly. The PG code 340 is used to maintain the out of PCM mode state (PG code 340 is >PG code threshold 1012) and entry into the PCM state (PG code 340<PG code threshold 1012). Since the entry level is programmable how the equality is handled is mostly arbitrary.

When in PCM, the reference comparator (comparator that receives the reference voltage as input) determines if the PCM PG code 1014 should be used or zero should be used. One may want the PCM duty cycle (time providing PCM PG code 1014 and time setting PGs to zero) to be less than 100%, such as to regulate the current output. If the current output is to remain about constant, the PCM PG code 1014 can be set to about 2× the PG code threshold 1012. As the load current increases or decreases the duty cycle changes (e.g., a load increase causes the percentage of time the signal is at the PCM PG code 1014 to increase). As the load current approaches the current represented by the PCM PG code 1014 the PCM will eventually reach a point where it is on 100% of the time. It is at this point that the average output voltage starts to drop. When the output voltage crosses the exit comparator level it switches back to the LC. This hand off can be handled as (i) The linear system is held such that it assumes the direct current (DC) value has been the PCM PG code 1014 and all PG code 340 changes have been ignored. This allows the PCM exit state (delivering PCM PG code 100% of the time) to exactly match the LC pseudo state (it has been forced to act like it has been delivering PCM PG code 1014 for some time).

(ii) The comparator switch, as well as enabling the LC also feeds into the now enabled LC and causes the LC to determine that the PCM PG DC value is no longer enough to maintain regulation so it increases the PG code 340 as it would normally.

The differences in entry PG code 340 and PCM PG code 1014 also create some hysteresis to avoid switching into and out of PCM mode too quickly (i.e. the effective load entry current is half (or other fraction) of the exit current using the assumptions above).

Figure 10:
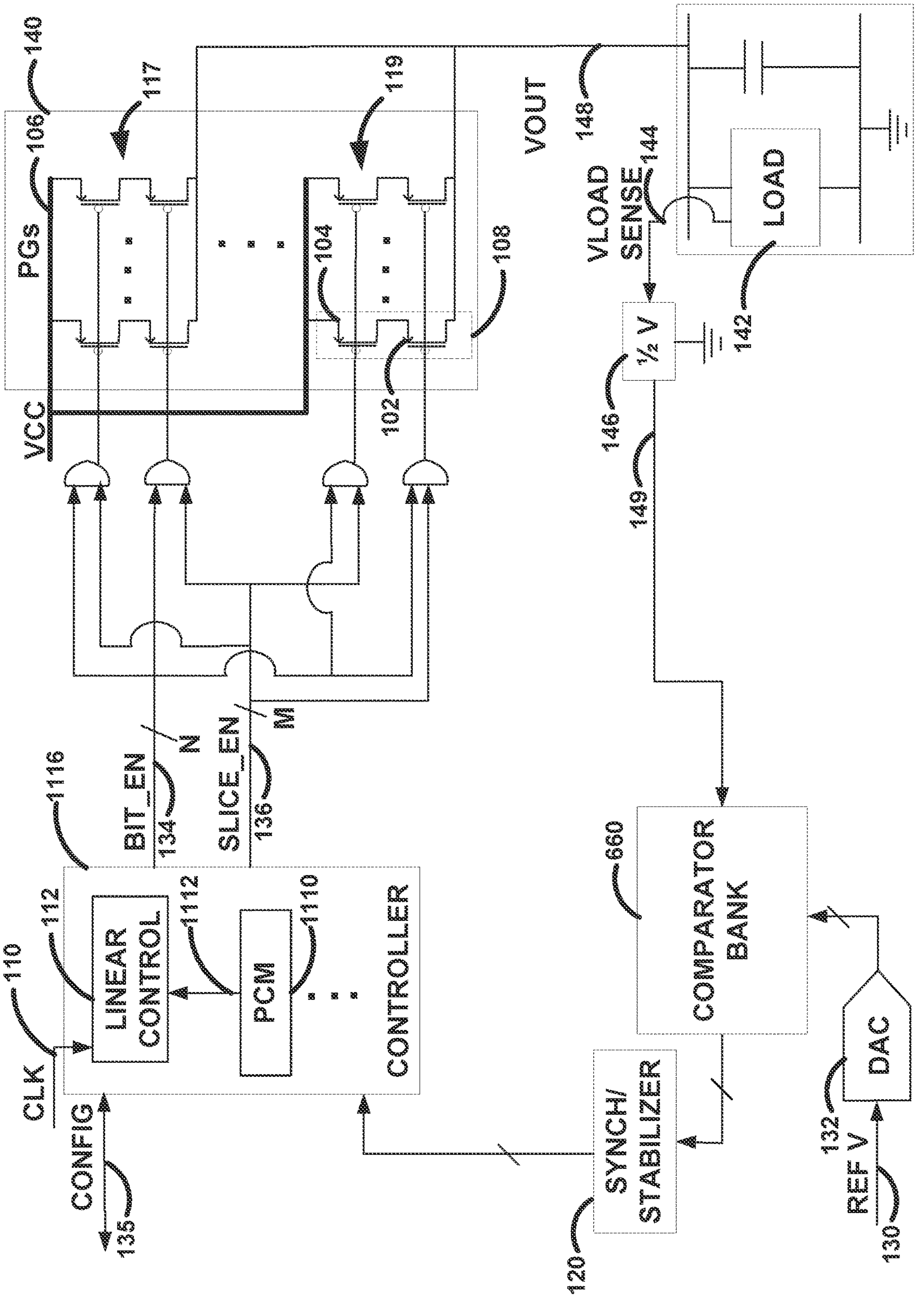
FIG. 10 illustrates, by way of example, a diagram of a circuit diagram of a DLVR system with a hybrid LC and PCM controller.

FIG. 10 illustrates, by way of example, a diagram of a circuit diagram of a DLVR system with a hybrid LC and PCM controller 1116. The controller 1116 as illustrated includes LC circuitry 112 and PCM circuitry 1110 to implement LC and PCM control and can optionally include the gradual NLC circuitry 150 and/or NLC circuitry 114 to implement gradual NLC or NLC in addition to LC and PCM control.

The system of FIG. 10 includes a comparator bank 660 that can include at least three of the comparators 122, 124, 126, 128, 152, 154. A first comparator of the three comparators identifies whether the voltage 149 is greater than or less than VREF 226 (from the DAC 132 and different from REF V 130). A second comparator of the three comparators identifies whether the voltage 149 is greater than the LC overshoot threshold 224. A third comparator of the three comparators identifies whether the voltage 149 is less than the LC undershoot threshold 228.

The PCM circuitry 1110 sets the PCM PG code 1112 responsive to detecting first specified criterion. The first specified criterion are detailed regarding FIG. 8. The first specified criterion can include the PG code 340 being less than the PG code threshold 1012, the voltage 149 being less than VREF, the voltage 149 being nominal (less than the LC overshoot threshold 224 and greater than the LC undershoot threshold 228), or a combination thereof.

The PCM circuitry 1110 sets the PCM PG code 340 to zero responsive to detecting second specified criterion, different from the first specified criterion. The second specified criterion can include the PG code 340 being less than the PG code threshold 1012 and the voltage 149 being greater than VREF or a combination thereof.

Figure 11:
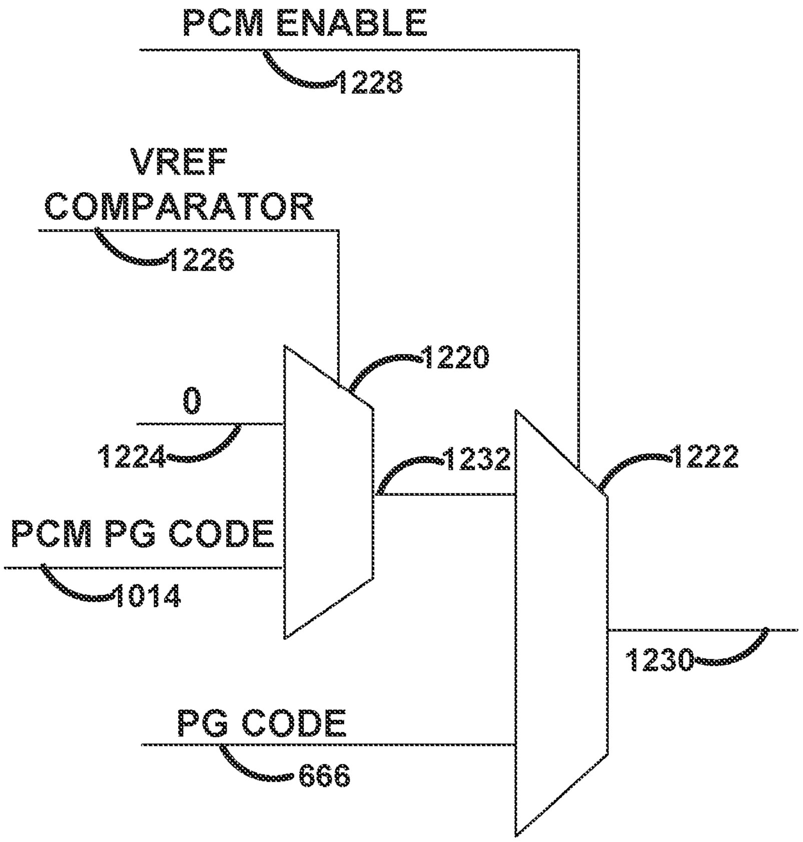
FIG. 11 illustrates, by way of example, a circuit diagram of an embodiment of a circuit for controlling whether the LC or the PCM controls the PG code.

FIG. 11 illustrates, by way of example, a circuit diagram of an embodiment of a circuit for controlling whether the LC or the PCM controls the PG code 340. The circuit as illustrated includes two multiplexers 1220, 1222 coupled in series with the multiplexer 1222 receiving output of the multiplexer 1220. The multiplexer 1220 receives a digital zero and the PCM PG code as input. The multiplexer 1220 is controlled by output 1226 of a VREF comparator (e.g., one of the comparators 122, 124, 126, 128, 152, 154) indicating whether the output voltage 149 is above or below VREF 226. The multiplexer 1220 provides the zero 1224 if the output voltage is above VREF 226 and provides the PCM PG code 1014 if the output voltage is below VREF 226.

The multiplexer 1222 receives output 1232 of the multiplexer 1220 and the PG code 340 as input. The multiplexer 1222 is controlled by a PCM enable signal 1228. The PCM enable signal 1228 is provided by a circuit that monitors whether criterion for entering PCM control mode are satisfied. The criterion are described previously and can include the PC code 340 being less than the PG code threshold 1012, the output voltage being nominal, or a combination thereof. The multiplexer 1222 provides an output 1230 that is equal to the output 1232 if PCM enable is asserted (or de-asserted if negative logic is used) and the PG code 1014 if PCM enable 1228 is de-asserted (or asserted if negative logic is used).

Figure 12:
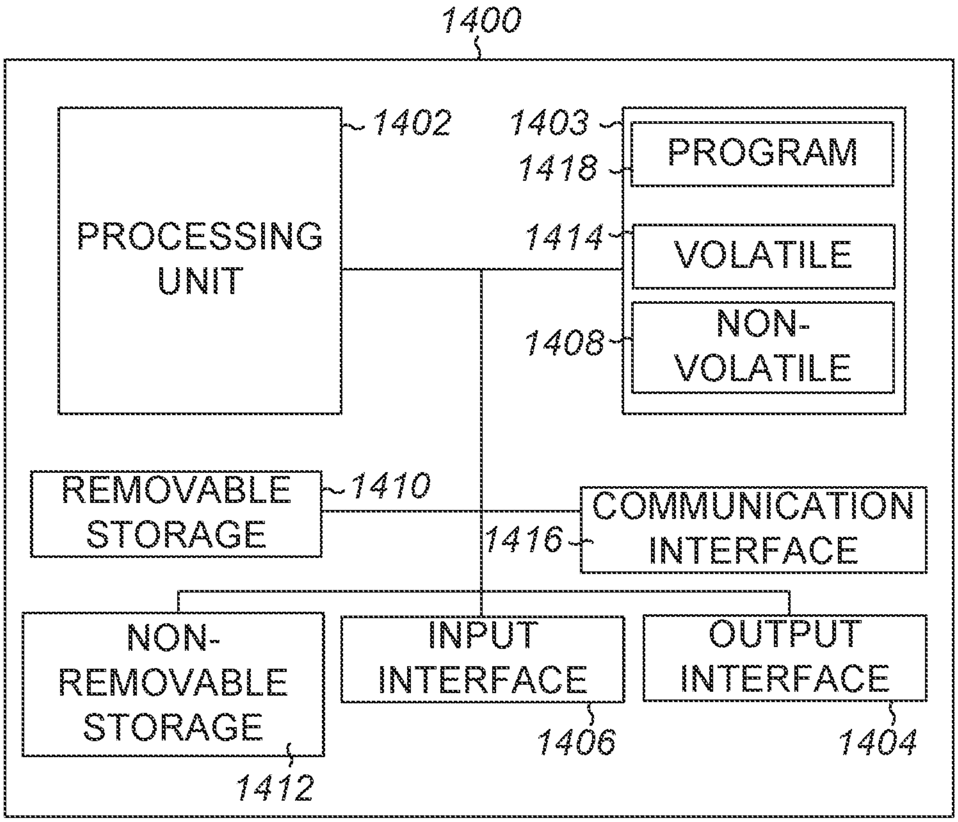
FIG. 12 illustrates, by way of example, a block diagram of an embodiment of a machine (e.g., a computer system) to implement one or more embodiments of controller logic.

FIG. 12 illustrates, by way of example, a block diagram of an embodiment of a machine 1400 (e.g., a computer system) to implement one or more embodiments of controller logic. The machine 1400 can implement a technique for improved VR controller operation. The VR controller 116 or a component thereof can include one or more of the components of the machine 1400. One or more of the VR controller 116, method 400, 900, 1300, or a component or operations thereof can be implemented, at least in part, using a component of the machine 1400. One example machine 1400 (in the form of a computer), may include a processing unit 1402, memory 1403, removable storage 1410, and non-removable storage 1412. Although the example computing device is illustrated and described as machine 1400, the computing device may be in different forms in different embodiments. Further, although the various data storage elements are illustrated as part of the machine 1400, the storage may also or alternatively include cloud-based storage accessible via a network, such as the Internet.

Memory 1403 may include volatile memory 1414 and non-volatile memory 1408. The machine 1400 may include—or have access to a computing environment that includes—a variety of computer-readable media, such as volatile memory 1414 and non-volatile memory 1408, removable storage 1410 and non-removable storage 1412. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1400 may include or have access to a computing environment that includes input 1406, output 1404, and a communication connection 1416. Output 1404 may include a display device, such as a touchscreen, that also may serve as an input device. The input 1406 may include one or more of a touchscreen, touchpad, mouse, keyboard, camera, one or more device-specific buttons, one or more sensors integrated within or coupled via wired or wireless data connections to the machine 1400, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1402 (sometimes called processing circuitry) of the machine 1400. A hard drive, CD-ROM, and RAM are some examples of articles including a non-transitory computer-readable medium such as a storage device. For example, a computer program 1418 may be used to cause processing unit 1402 to perform one or more methods or algorithms described herein.

Note that the term "circuitry" as used herein refers to, is part of, or includes hardware components, such as transistors, resistors, capacitors, diodes, inductors, amplifiers, oscillators, switches, multiplexers, logic gates (e.g., AND, OR, XOR), power supplies, memories, or the like, such as can be configured in an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term “circuitry” may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term “processor circuitry” or “processor” as used herein thus refers to, is part of, or includes circuitry capable of sequentially and automatically carrying out a sequence of arithmetic or logical operations, or recording, storing, and/or transferring digital data. The term “processor circuitry” or “processor” may refer to one or more application processors, one or more baseband processors, a physical central processing unit (CPU), a single- or multi-core processor, and/or any other device capable of executing or otherwise operating computer-executable instructions, such as program code, software modules, and/or functional processes.

ADDITIONAL NOTES AND EXAMPLES

Example 1 includes a digital voltage regulator (DVR) comprising first, second, and third comparators configured to determine whether a load voltage (VLOAD) (i) drops below a gradual non-linear control (NLC) undershoot threshold voltage, (ii) rises above or drops below a reference voltage, and (iii) rises above a gradual NLC overshoot threshold voltage, respectively, power gates (PGs) configured to adjust an output voltage (VOUT) based on a provided power gate (PG) code, and voltage regulator (VR) controller circuitry comprising synchronous LC circuitry configured to increase or decrease, by a first increment, the PG code responsive to the VLOAD dropping below the reference voltage and rising above the reference voltage, respectively, and asynchronous gradual NLC circuitry configured to increase or decrease, by a second increment greater than the first increment and less than half a maximum PG code value, the PG code responsive to the VLOAD dropping below the gradual NLC undershoot threshold voltage and rising above the gradual NLC overshoot threshold voltage, respectively.

In Example 2, Example further includes, wherein the asynchronous gradual NLC circuitry is configured to provide a boost signal to the LC circuitry indicating that the PG code was adjusted by the second increment, and responsive to receiving the boost signal, the LC circuitry is configured to increase the PG code by a third increment greater than the first increment.

In Example 3, Example 2 further includes, wherein the third increment is less than the second increment.

In Example 4, at least one of Examples 1-3 further includes a fourth comparator configured to determine whether the VLOAD drops below an NLC undershoot threshold voltage less than the gradual NLC undershoot threshold voltage, and wherein the VR controller circuitry further comprises asynchronous NLC circuitry configured to, responsive to the VLOAD dropping below the NLC undershoot threshold voltage increase the PG code by a fourth increment based on a number of consecutive NLC undershoot events, the fourth increment greater than the second increment.

In Example 5, Example 4 further includes a fifth comparator configured to determine whether the VLOAD rises above an NLC overshoot threshold voltage greater than the gradual NLC threshold, and wherein the asynchronous NLC circuitry is further configured to, responsive to the VLOAD rising above the NLC overshoot threshold voltage, increase the PG code based on a number of consecutive NLC overshoot events.

In Example 6, Example 5 further includes a sixth comparator configured to determine whether the VLOAD drops below an LC undershoot threshold voltage greater than the gradual NLC undershoot threshold voltage and less than the reference voltage, and wherein the LC circuitry is configured to, responsive to the VLOAD dropping below the LC undershoot threshold voltage increase the PG code by a fifth increment.

In Example 7, Example 6 further includes a seventh comparator configured to determine whether the VLOAD rises above an LC overshoot threshold voltage less than the gradual NLC overshoot threshold voltage and greater than the reference voltage, and wherein the LC circuitry is configured to, responsive to the VLOAD rising above the LC undershoot threshold voltage decrease the PG code by the fifth increment.

In Example 8, Example 7 further includes a multi-stage digital-to-analog converter (DAC) configured to generate the reference voltage, the gradual NLC overshoot voltage, the gradual NLC undershoot voltage, the NLC overshoot voltage, the NLC undershoot voltage, the LC overshoot voltage, and the LC undershoot voltage.

In Example 9, at least one of Examples 1-8 further includes, wherein the voltage regulator (VR) controller circuitry further includes an eighth comparator configured to determine whether the PG code is than a specified PG code threshold value, and pulse current mode (PCM) circuitry configured to set the PG code to zero responsive to the first comparator indicating VOUT is greater than the reference voltage, and until the first comparator indicates VOUT is less than the reference voltage.

In Example 10, Example 9 further includes, wherein the PCM circuitry is further configured to set the PG code to a specified PCM PG code value responsive to the first comparator indicating VOUT is less than the reference voltage, and until the first comparator indicates VOUT is greater than the reference voltage or the VOUT drops below an LC undershoot voltage.

Example 11 includes a digital voltage regulator (DVR) comprising a first comparator configured to determine whether an output voltage (VOUT) is less than or greater than a reference voltage, power gates (PGs) configured to adjust the VOUT based on a provided power gate (PG) code, voltage regulator (VR) controller circuitry comprising a second comparator configured to determine whether the PG code is than a specified PG code threshold value; and pulse current mode (PCM) circuitry configured to set the PG code to zero responsive to the first comparator indicating VOUT is greater than the reference voltage, and until the first comparator indicates VOUT is less than the reference voltage.

In Example 12, Example 11 further includes, wherein the PCM circuitry is further configured to set the PG code to a specified PCM PG code value responsive to the first comparator indicating VOUT is less than the reference voltage, and until the first comparator indicates VOUT is greater than the reference voltage or the VOUT drops below an LC undershoot voltage.

In Example 13, Example 12 further includes a third comparator configured to determine whether the VOUT is less than the LC undershoot voltage.

In Example 14, Example 13 further includes, wherein the PG code is set to the PCM PG code responsive to the third comparator determining the VOUT is less than the LC undershoot threshold.

In Example 15, at least one of Examples 11-14 further includes, wherein the PCM PG code is greater than the PG code threshold.

In Example 16, at least one of Examples 11-15 further includes, wherein the PCM circuitry is further configured to maintain the PG code at zero responsive to VOUT rising above a gradual NLC overshoot threshold voltage.

In Example 17, at least one of Examples 13-16 further includes, wherein the controller circuitry further comprises LC circuitry configured to control the PG code responsive to the VOUT dropping below the LC undershoot threshold voltage.

In Example 18, Example 17 further includes a fourth comparator configured to determine whether the VOUT is greater than an LC overshoot threshold voltage, and wherein the PCM circuitry is further configured to adjust the PG code responsive to the third comparator indicating the VOUT is greater than the LC undershoot threshold voltage, and the fourth comparator indicating the VOUT is less than the LC overshoot threshold voltage.

Example 19 includes a digital voltage regulator (DVR) system comprising first, second, third, fourth, fifth, sixth, and seventh comparators configured to determine whether a load voltage (VLOAD) (i) drops below a non-linear control (NLC) undershoot threshold voltage, (ii) drops below a gradual NLC undershoot threshold voltage, (iii) drops below a linear control (LC) undershoot threshold voltage, (iv) rises above or drops below a reference voltage, (v) rises above an LC overshoot threshold voltage, (vi) rises above a gradual NLC overshoot threshold voltage, and (vii) rises above an NLC overshoot threshold, respectively, power gates (PGs) configured to adjust an output voltage (VOUT) based on a provided power gate (PG) code, and voltage regulator (VR) controller circuitry comprising synchronous LC circuitry configured to increase or decrease, by a first increment, the PG code responsive to the VLOAD dropping below the reference voltage and rising above the reference voltage, respectively, and increase or decrease, by a second increment, the PG code responsive to the VLOAD dropping below the LC undershoot threshold voltage or the VLOAD rising above the LC overshoot threshold voltage, asynchronous gradual NLC circuitry configured to increase or decrease, by a third increment greater than the first increment and less than half a maximum PG code value, the PG code responsive to the VLOAD dropping below the gradual NLC undershoot threshold voltage and rising above the gradual NLC overshoot threshold voltage, respectively, and asynchronous NLC circuitry configured to increase or decrease, by a fourth increment greater than the third increment, the PG code responsive to the VLOAD dropping below the NLC undershoot threshold voltage and rising above the NLC overshoot threshold voltage, respectively.

In Example 20, Example 19 further includes, wherein the asynchronous gradual NLC circuitry is configured to provide a boost signal to the LC circuitry indicating that the PG code was adjusted by the second increment, and responsive to receiving the boost signal, the LC circuitry is configured to increase the PG code by a third increment greater than the first increment.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A digital voltage regulator (DVR) comprising:

first, second, and third comparators configured to determine whether a load voltage (VLOAD) (i) drops below a gradual non-linear control (NLC) undershoot threshold voltage, (ii) rises above or drops below a reference voltage, and (iii) rises above a gradual NLC overshoot threshold voltage, respectively;

power gates (PGs) configured to adjust an output voltage (VOUT) based on a provided power gate (PG) code; and voltage regulator (VR) controller circuitry comprising:

synchronous LC circuitry configured to increase or decrease, by a first increment, the PG code responsive to the VLOAD dropping below the reference voltage and rising above the reference voltage, respectively, and asynchronous gradual NLC circuitry configured to increase or decrease, by a second increment greater than the first increment and less than half a maximum PG code value, the PG code responsive to the VLOAD dropping below the gradual NLC undershoot threshold voltage and rising above the gradual NLC overshoot threshold voltage, respectively.

2. The DVR of claim 1, wherein:

the asynchronous gradual NLC circuitry is configured to provide a boost signal to the LC circuitry indicating that the PG code was adjusted by the second increment, and responsive to receiving the boost signal, the LC circuitry is configured to increase the PG code by a third increment greater than the first increment.

3. The DVR of claim 2, wherein the third increment is less than the second increment.

4. The DVR of claim 1, further comprising:

a fourth comparator configured to determine whether the VLOAD drops below an NLC undershoot threshold voltage less than the gradual NLC undershoot threshold voltage; and wherein the VR controller circuitry further comprises asynchronous NLC circuitry configured to, responsive to the VLOAD dropping below the NLC undershoot threshold voltage increase the PG code by a fourth increment based on a number of consecutive NLC undershoot events, the fourth increment greater than the second increment.

5. The DVR of claim 4, further comprising:

a fifth comparator configured to determine whether the VLOAD rises above an NLC overshoot threshold voltage greater than the gradual NLC threshold; and wherein the asynchronous NLC circuitry is further configured to, responsive to the VLOAD rising above the NLC overshoot threshold voltage, increase the PG code based on a number of consecutive NLC overshoot events.

6. The DVR of claim 5, further comprising:

a sixth comparator configured to determine whether the VLOAD drops below an LC undershoot threshold voltage greater than the gradual NLC undershoot threshold voltage and less than the reference voltage; and wherein the LC circuitry is configured to, responsive to the VLOAD dropping below the LC undershoot threshold voltage increase the PG code by a fifth increment.

7. The DVR of claim 6, further comprising:

a seventh comparator configured to determine whether the VLOAD rises above an LC overshoot threshold voltage less than the gradual NLC overshoot threshold voltage and greater than the reference voltage; and wherein the LC circuitry is configured to, responsive to the VLOAD rising above the LC undershoot threshold voltage decrease the PG code by the fifth increment.

8. The DVR of claim 7, further comprising a multi-stage digital-to-analog converter (DAC) configured to generate the reference voltage, the gradual NLC overshoot voltage, the gradual NLC undershoot voltage, the NLC overshoot voltage, the NLC undershoot voltage, the LC overshoot voltage, and the LC undershoot voltage.

9. The DVR of claim 1, wherein the voltage regulator (VR) controller circuitry further includes:

an eighth comparator configured to determine whether the PG code is than a specified PG code threshold value; and pulse current mode (PCM) circuitry configured to set the PG code to zero:

responsive to the first comparator indicating VOUT is greater than the reference voltage; and until the first comparator indicates VOUT is less than the reference voltage.

10. The DVR of claim 9, wherein the PCM circuitry is further configured to set the PG code to a specified PCM PG code value:

responsive to the first comparator indicating VOUT is less than the reference voltage; and until the first comparator indicates VOUT is greater than the reference voltage or the VOUT drops below an LC undershoot voltage.

11. The DVR of claim 1, wherein:

the asynchronous gradual NLC circuitry is configured to provide a boost signal to the LC circuitry indicating that the PG code was adjusted by the second increment, and responsive to receiving the boost signal, the LC circuitry is configured to increase the PG code by a third increment greater than the first increment.

12. A digital voltage regulator (DVR) comprising:

a first comparator configured to determine whether an output voltage (VOUT) is less than or greater than a reference voltage;

power gates (PGs) configured to adjust the VOUT based on a provided power gate (PG) code;

voltage regulator (VR) controller circuitry comprising:

a second comparator configured to determine whether the PG code is than a specified PG code threshold value; and pulse current mode (PCM) circuitry configured to set the PG code to zero:

responsive to the first comparator indicating VOUT is greater than the reference voltage; and until the first comparator indicates VOUT is less than the reference voltage.

13. The DVR of claim 12, wherein the PCM circuitry is further configured to set the PG code to a specified PCM PG code value:

responsive to the first comparator indicating VOUT is less than the reference voltage; and until the first comparator indicates VOUT is greater than the reference voltage or the VOUT drops below an LC undershoot voltage.

14. The DVR of claim 13, further comprising a third comparator configured to determine whether the VOUT is less than the LC undershoot voltage.

15. The DVR of claim 14, wherein the PG code is set to the PCM PG code responsive to the third comparator determining the VOUT is less than the LC undershoot threshold.

16. The DVR of claim 14, wherein the controller circuitry further comprises LC circuitry configured to control the PG code responsive to the VOUT dropping below the LC undershoot threshold voltage.

17. The DVR of claim 16, further comprising:

a fourth comparator configured to determine whether the VOUT is greater than an LC overshoot threshold voltage; and wherein the PCM circuitry is further configured to adjust the PG code responsive to:

the third comparator indicating the VOUT is greater than the LC undershoot threshold voltage; and the fourth comparator indicating the VOUT is less than the LC overshoot threshold voltage.

18. A digital voltage regulator (DVR) system comprising first, second, third, fourth, fifth, sixth, and seventh comparators configured to determine whether a load voltage (VLOAD) (i) drops below a non-linear control (NLC) undershoot threshold voltage, (ii) drops below a gradual NLC undershoot threshold voltage, (iii) drops below a linear control (LC) undershoot threshold voltage, (iv) rises above or drops below a reference voltage, (v) rises above an LC overshoot threshold voltage, (vi) rises above a gradual NLC overshoot threshold voltage, and (vii) rises above an NLC overshoot threshold, respectively;

power gates (PGs) configured to adjust an output voltage (VOUT) based on a provided power gate (PG) code; and voltage regulator (VR) controller circuitry comprising:

synchronous LC circuitry configured to increase or decrease, by a first increment, the PG code responsive to the VLOAD dropping below the reference voltage and rising above the reference voltage, respectively, and increase or decrease, by a second increment, the PG code responsive to the VLOAD dropping below the LC undershoot threshold voltage or the VLOAD rising above the LC overshoot threshold voltage;

asynchronous gradual NLC circuitry configured to increase or decrease, by a third increment greater than the first increment and less than half a maximum PG code value, the PG code responsive to the VLOAD dropping below the gradual NLC undershoot threshold voltage and rising above the gradual NLC overshoot threshold voltage, respectively; and asynchronous NLC circuitry configured to increase or decrease, by a fourth increment greater than the third increment, the PG code responsive to the VLOAD dropping below the NLC undershoot threshold voltage and rising above the NLC overshoot threshold voltage, respectively.

19. The DVR of claim 12, wherein the PCM PG code is greater than the PG code threshold.

20. The DVR of claim 12, wherein the PCM circuitry is further configured to maintain the PG code at zero responsive to VOUT rising above a gradual NLC overshoot threshold voltage.

* * * * *